(12) United States Patent
Kawawa

(10) Patent No.: US 9,966,046 B2
(45) Date of Patent: May 8, 2018

(54) IMAGE PROCESSING APPARATUS

(71) Applicant: CANON KABUSHIKI KAISHA, Tokyo (JP)

(72) Inventor: Yasuhiro Kawawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/728,920

(22) Filed: Jun. 2, 2015

(65) Prior Publication Data
US 2015/0356762 A1 Dec. 10, 2015

(30) Foreign Application Priority Data
Jun. 9, 2014 (JP) .................. 2014-119051

(51) Int. Cl.
*G06F 3/14* (2006.01)
*G09G 5/377* (2006.01)
*G06T 3/40* (2006.01)
*G06T 3/00* (2006.01)

(52) U.S. Cl.
CPC ............ *G09G 5/377* (2013.01); *G06F 3/14* (2013.01); *G09G 2340/02* (2013.01); *G09G 2340/0407* (2013.01); *G09G 2370/022* (2013.01)

(58) Field of Classification Search
CPC ......... G06F 3/14; G06T 3/40; G09G 2340/02; G09G 2340/0407; G09G 2370/022; G09G 5/377
USPC ....................................... 345/629
See application file for complete search history.

(56) References Cited

U.S. PATENT DOCUMENTS

| 2002/0135794 A1* | 9/2002 | Rodriguez ........ G06F 17/30902 358/1.15 |
| 2010/0156916 A1* | 6/2010 | Muikaichi ................ G09G 5/14 345/536 |
| 2010/0245651 A1* | 9/2010 | Minamino .............. G06T 13/80 348/333.05 |

(Continued)

FOREIGN PATENT DOCUMENTS

| CN | 101542587 A | 9/2009 |
| CN | 102457678 A | 5/2012 |
| JP | 9-163258 A | 6/1997 |

OTHER PUBLICATIONS

JPH09163258A (Machine Translation on Sep. 29, 2016).*

Primary Examiner — Gregory J Tryder
Assistant Examiner — Michael Le
(74) Attorney, Agent, or Firm — Canon U.S.A., Inc. IP Division

(57) ABSTRACT

An image processing apparatus capable of mutually communicating with an external apparatus via a network includes a first generation unit, a second generation unit, a determination unit, a setting unit, a first control unit, and a transmission unit. The first generation unit generates a first image in a predetermined image size. The second generation unit generates a second image to be superimposed on the first image. The determination unit determines a protocol type of a control command for controlling the first generation unit and the second generation unit, wherein the control command is received via the network. The setting unit sets an image size of the first image. The first control unit changes a settable range of the image size set by the setting unit according to a determination result of the determination unit. The transmission unit transmits the first image via the network.

24 Claims, 9 Drawing Sheets

(56) References Cited

U.S. PATENT DOCUMENTS

2012/0098854 A1* 4/2012 Ohnishi ............... G03B 21/26
  345/626

* cited by examiner

FIG. 9

| PROTOCOL TYPE | LOWER-LIMIT RESOLUTION FOR SUPERIMPOSING OSD |
|---|---|
| ONVIF | 320x240 |
| GB28181 | 352x288 |

IMAGE PROCESSING APPARATUS

BACKGROUND OF THE INVENTION

Field of the Invention

The present invention relates to an image processing apparatus. For example, the present invention relates to an image processing apparatus for superimposing an arbitrary image on an image and transmitting the resultant image.

Description of the Related Art

Conventionally, in order to display characters or the like on an image, for example, an imaging apparatus has been provided with a function for superimposing an on-screen display (hereinafter, referred to as "OSD") on the image. In order to realize this function, the imaging apparatus stores a plurality of fonts and the like and selects a font to superimpose it as the OSD. Further, for example, in a case where the OSD is superimposed on an image having low resolution (i.e., small image size), there arises a problem in that an area where a user would like to check the image is covered by the OSD. Therefore, restriction may be placed on an image size for superimposing the OSD thereon.

Further, according to a technique discussed in Japanese Patent Application Laid-Open No. 9-163258, an OSD and an image output are switched in a display output or the like in a video signal according to a content input by a user.

On the other hand, for example, the open network video interface forum (ONVIF) has been established as a communication protocol used for the communication between an imaging apparatus and an external apparatus. In addition, the GB/T28181 (also referred to as "GB28181") has been also established as a Chinese national standard. Therefore, the imaging apparatus has to also support a plurality of protocols including the above-described communication protocols.

SUMMARY OF THE INVENTION

However, in a case where a required image size is designated, with respect to the required image size prescribed by the communication protocol, the image size for superimposing the OSD thereon may not be suitable. In other words, when the imaging apparatus supports a plurality of communication protocols, there is a problem in that the OSD may not be properly superimposed on the required image size prescribed by the communication protocol.

The present invention is directed to an image processing apparatus capable of adjusting the image size of an image to be superimposed with a superimposed image according to a method of a control command for a communication protocol. In a case where an image processing apparatus supports a plurality of communication protocols and an on-screen display (OSD) may not be properly superimposed on an image of an image size prescribed by the communication protocol. To solve this problem, the image processing apparatus determines a method of the communication protocol and changes a settable range of the image size of the image on which an OSD is superimposed according to a determination result.

According to an aspect of the present invention, an image processing apparatus capable of mutually communicating with an external apparatus via a network includes a first generation unit configured to generate a first image in a predetermined image size, a second generation unit configured to generate a second image to be superimposed on the first image, a determination unit configured to determine a protocol type of a control command for controlling the first generation unit and the second generation unit, wherein the control command is received via the network, a setting unit configured to set an image size of the first image, a first control unit configured to change a settable range of the image size set by the setting unit according to a determination result of the determination unit, and a transmission unit configured to transmit the first image via the network.

Further features of the present invention will become apparent from the following description of exemplary embodiments with reference to the attached drawings.

BRIEF DESCRIPTION OF THE DRAWINGS

FIG. 9 is a table illustrating a communication protocol and lower-limit resolution required for superimposing the OSD.

DESCRIPTION OF THE EMBODIMENTS

Hereinafter, an exemplary embodiment of the present invention will be described in detail with reference to the appended drawings. A configuration according to the exemplary embodiment described below is merely an example, and thus the present invention is not limited to the configuration described below.

Figure 1:
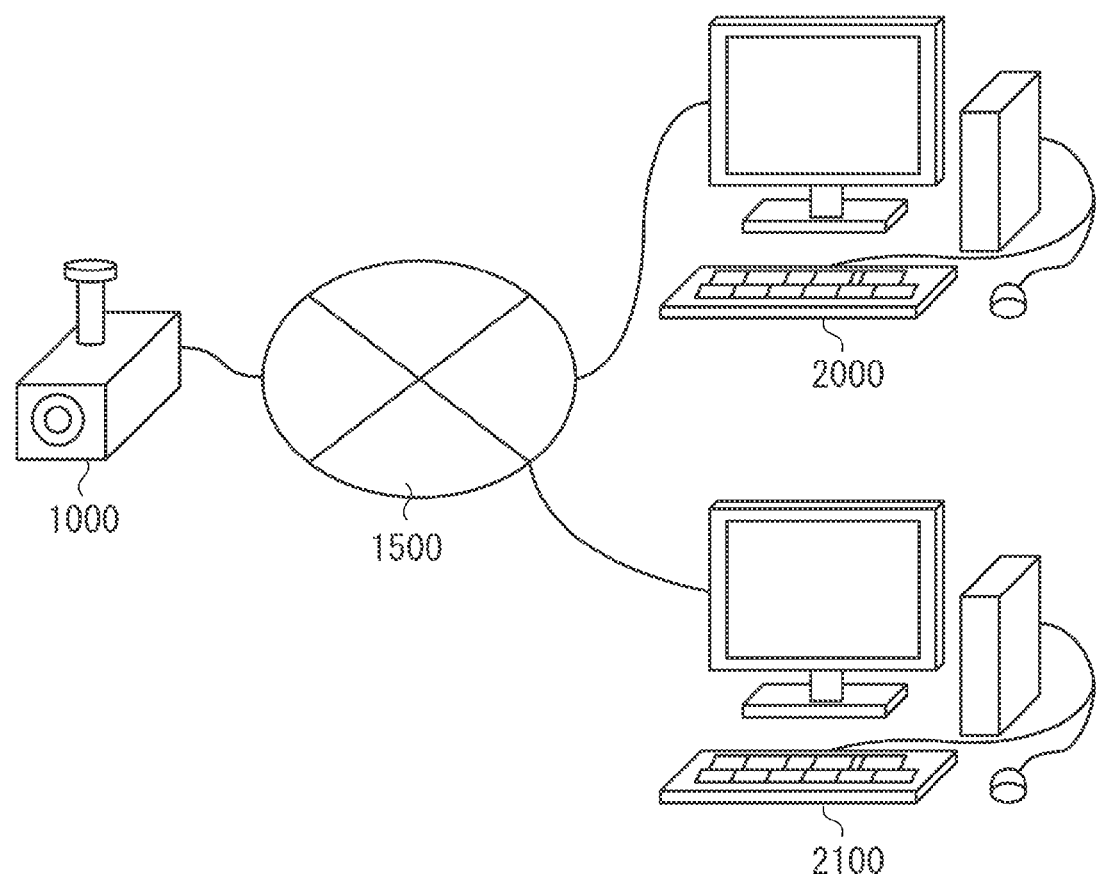
FIG. 1 is a diagram illustrating a network configuration including a configuration of an imaging apparatus according to an exemplary embodiment.

FIG. 1 is a system configuration diagram illustrating an imaging system configured of an imaging apparatus (image processing apparatus) 1000 and client apparatuses 2000 and 2100 serving as external apparatuses. The imaging apparatus 1000 and the client apparatuses 2000 and 2100 are connected to each other in a mutually communicable state via an internet protocol (IP) network 1500 configured of a local area network (LAN) and the like.

For example, the IP network 1500 may be configured of the Internet, a wired LAN, a wireless LAN, and/or a wide area network (WAN). In addition, the imaging apparatus (monitoring camera) 1000 according to the present exemplary embodiment may support the Power Over Ethernet (PoE) (registered trademark), so that the power may be supplied thereto via a LAN cable. Further, in the present exemplary embodiment, a monitoring camera is taken as an example of the imaging apparatus 1000.

In FIG. 1, the client apparatus 2000 (2100) can transmit commands described below for instructing the imaging apparatus 1000 to change an image compression method or to start streaming of a moving image and/or audio data. On the other hand, the imaging apparatus 1000 can transmit a response in response to the command to the client apparatus 2000 (2100), and starts streaming of the moving image or the audio data to the client apparatus 2000 (2100).

Figure 2:
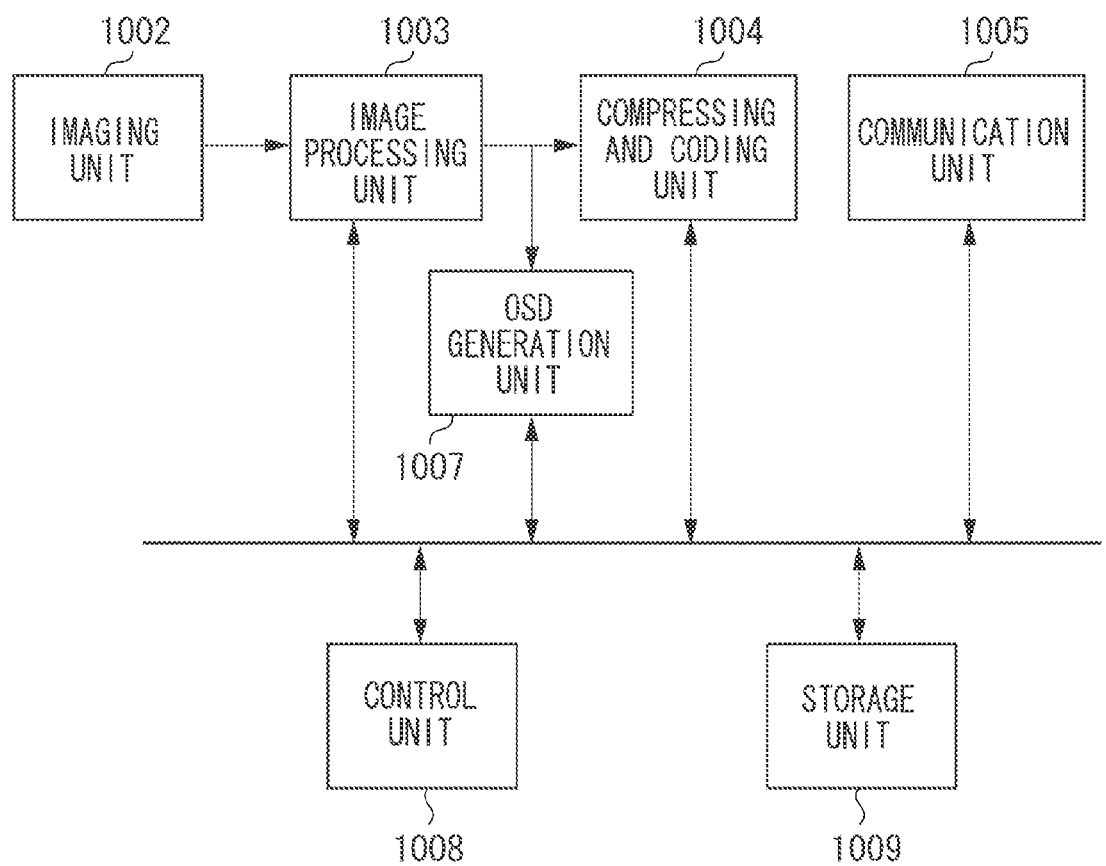
FIG. 2 is a block diagram of the imaging apparatus according to an exemplary embodiment.

FIG. 2 is a block diagram illustrating a configuration of the imaging apparatus 1000 according to the present exemplary embodiment. In FIG. 2, the imaging apparatus 1000 includes an imaging unit 1002, an image processing unit 1003, a compressing and coding unit 1004, a communication unit 1005, an OSD generation unit 1007, a control unit 1008, and a storage unit 1009.

Hereinafter, an operation of the imaging apparatus 1000 according to the present exemplary embodiment will be described with reference to FIG. 2. The imaging unit 1002 captures a formed object image and outputs a video signal thereof. Further, the imaging unit 1002 includes a lens through which an object image is formed, and a lens control unit for controlling the lens (not illustrated). The video signal output from the imaging unit 1002 is input to the image processing unit 1003.

According to an instruction from the control unit 1008 described below, the image processing unit 1003 executes image processing on a captured image output from the imaging unit 1002. Then, after executing the image processing, the image processing unit 1003 outputs the processed captured image to the compressing and coding unit 1004. According to an instruction from the control unit 1008, the compressing and coding unit 1004 compresses and encodes the captured image output from the image processing unit 1003.

The communication unit 1005 distributes the captured image compressed and encoded by the compressing and coding unit 1004 to the client apparatus 2000 via the IP network 1500. Then, the communication unit 1005 receives an OSD setting command transmitted from the client apparatus 2000 via the IP network 1500. Further, the communication unit 1005 receives a coding setting command transmitted from the client apparatus 2000 via the IP network 1500.

Furthermore, the communication unit 1005 receives a setting command with respect to the captured image (hereinafter, also referred to as "image setting command"), which is to be processed by the imaging unit 1002 or the image processing unit 1003. For example, the image setting command includes a setting command of an image size and a setting command relating to exposure control such as a white balance or a gain with respect to the object image. In the present exemplary embodiment, the communication unit 1005 corresponds to a receiving unit for receiving a command from the client apparatus 2000.

When the communication unit 1005 receives the setting command for the image, the imaging apparatus 1000 analyzes the content of the command using the control unit 1008 and inputs the analyzed result to the image processing unit 1003. At the same time, image setting information is stored in the storage unit 1009, so that the control unit 1008 executes setting of the image processing unit 1003 according to the image setting information stored in the storage unit 1009. The image processing unit 1003 executes image processing according to the image setting information, and inputs the image data to the compressing and coding unit 1004.

In addition, the control unit 1008 is configured of a central processing unit (CPU). Further, the control unit 1008 collectively controls the constituent elements of the imaging apparatus 1000. Then, the control unit 1008 executes a program stored in the storage unit 1009. Alternatively, the control unit 1008 may execute the control processing by using hardware.

The storage unit 1009 is used as a storage region of various kinds of data, and mainly used as a storage region of a program executed by the control unit 1008, a work region of the program in execution, or a storage region of the image data generated by the imaging unit 1002 described below. The image processing unit 1003 uses the storage unit 1009 as a storage region of the image setting information. Furthermore, the control unit 1008 uses the storage unit 1009 as a storage region of parameters and commands for controlling each unit.

The communication unit 1005 receives an OSD setting command from the client apparatus 2000 (2100). The OSD setting command is received by the communication unit 1005, analyzed by the control unit 1008, and input to the OSD generation unit 1007 as OSD setting information. Further, the OSD setting information is stored in the storage unit 1009. The OSD generation unit 1007 generates an OSD super imposition image according to the received OSD setting information, and inputs the OSD super imposition image to the compressing and coding unit 1004.

The communication unit 1005 receives a coding setting command from the client apparatus 2000. The coding setting command is analyzed by the control unit 1008, stored in the storage unit 1009, and input to the compressing and coding unit 1004. For example, the coding setting command includes specification information relating to a coding method, an image size, or resolution of the image. The compressing and coding unit 1004 compresses and encodes the object image received from the image processing unit 1003 through a specified coding method according to a plurality of specified image sizes or specified image resolutions. At the same time, the compressing and coding unit 1004 superimposes the OSD super imposition image generated by the OSD generation unit 1007 on the image processed by the image processing unit 1003, and outputs that image as an image compressed and coded into a plurality of the image sizes or the resolution.

Further, the communication unit 1005 receives a distribution start command from the client apparatus 2000. The distribution start command is input to the control unit 1008 in order to determine the communication protocol. A protocol type is stored in the storage unit 1009 and input to the OSD generation unit 1007. The fonts corresponding to the protocols are stored in the storage unit 1009, so that the imaging apparatus 1000 can support the protocol even if a specific font is prescribed for that protocol. In order to superimpose the OSD on the images in different resolution (hereinafter, the term "resolution" is used synonymously with "image size"), the fonts in different sizes are also stored in the storage unit 1009. Further, the OSD generation unit 1007 sets the lower-limit resolution for superimposing the OSD so that the image can be prevented from being covered by the OSD even if the resolution thereof is extremely low. In addition, the lower-limit resolution for superimposing the OSD may be set thereto when the imaging apparatus 1000 is manufactured at the factory, or may be set by the client apparatus 2000.

Figure 3:
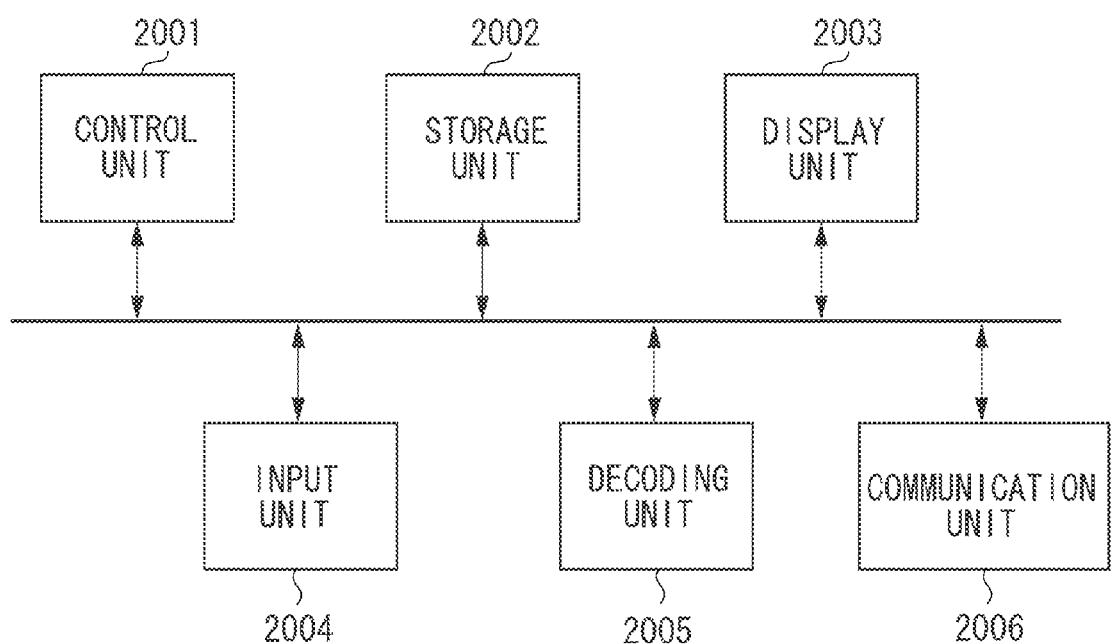
FIG. 3 is a block diagram of a client apparatus according to an exemplary embodiment.

FIG. 3 is a block diagram illustrating a configuration of the client apparatus 2000 (2100) according to the present exemplary embodiment. A control unit 2100 of the client apparatus 2000 (2100) is configured of a CPU. The control unit 2001 collectively controls the constituent elements of the client apparatus 2000 (2100). Further, the control unit 2001 executes a program stored in a storage unit 2002 described below. Further, the control unit 2001 may execute control processing by using hardware.

The storage unit 2002 is used as a storage region of various kinds of data, and mainly used as a storage region of a program executed by the control unit 2001 or a work region of the program in execution.

A display unit 2003 is configured of a liquid crystal display (LCD) or an organic electroluminescence (EL) display. The display unit 2003 displays information to the user who operates the client apparatus 2000 (2100). More specifically, the display unit 2003 displays various setting screens including a distribution image setting screen described below, a live image streamed from the imaging apparatus 1000, and various messages.

An input unit 2004 is configured of, for example, a button, a cross-key, a touch panel, and a mouse. The content of a screen operation executed by the user is notified to the control unit 2001 through the input unit 2004.

A decoding unit 2005 executes decoding processing on the encoded image data output from the communication unit 2006 through a compressing and coding format such as the joint photographic experts group (JPEG) or the H.264 format, and expands the image data on the storage unit 2002.

The communication unit 2006 is used to exchange data with the imaging apparatus 1000. For example, the communication unit 2006 transmits a request command to the imaging apparatus 1000 via the IP network 1500. Further, the communication unit 2006 receives a response from the imaging apparatus 1000 via the IP network 1500, and outputs the received response to the control unit 2001. Further, the communication unit 2006 receives a moving image or audio data streamed from the imaging apparatus 1000. In the present exemplary embodiment, the client apparatus 2000 performs communication based on the ONVIF standard whereas the client apparatus 2001 performs communication based on the GB28181 standard. However, the communication standards are not limited thereto, and thus the client apparatus 2000 (2100) may perform communication by switching a plurality of communication protocols.

Subsequently, a superimposing operation of the OSD super imposition image executed by the imaging apparatus 1000 will be described with reference to the flowchart in FIG. 4. This processing is executed by the control unit 1008.

In step S3001, the imaging apparatus 1000 receives an OSD setting command from the client apparatus 2000 via the communication unit 1005. The control unit 1008 executes appropriate packet processing, analyzes the received OSD setting command, and generates OSD setting information. Then, the control unit 1008 stores the generated OSD setting information in the storage unit 1009. Further, the OSD generation unit 1007 receives the OSD setting information analyzed by the control unit 1008. Then, the processing proceeds to step S3002.

In step S3002, the control unit 1008 acquires resolution of the image specified by the image setting information from a list of resolution stored in the storage unit 1009. Then, the processing proceeds to step S3003.

In step S3003, the control unit 1008 acquires a protocol type for transmitting the image set by the client apparatus 2000. Then, the processing proceeds to step S3004.

In step S3004, the control unit 1008 calculates the lower-limit resolution for superimposing the OSD based on the protocol type acquired in step S3003. In other words, the control unit 1008 determines the protocol type. Then, according to the required distribution resolution determined by the above determination, the control unit 1008 determines the lower-limit resolution (i.e., comparative resolution) for superimposing the OSD, so that the OSD is properly superimposed on the distribution image. Then, the processing proceeds to step S3005.

In step S3005, the control unit 1008 performs a comparison-determination on whether the resolution acquired in step S3002 is equal to or higher than the lower-limit resolution for superimposing the OSD calculated in step S3004. As a comparison-determination result, if the control unit 1008 determines that the resolution is equal to or higher than the lower-limit resolution (YES in step S3005), the processing proceeds to step S3006. On the other hand, if the control unit 1008 determines that the resolution is lower than the lower-limit resolution (NO in step S3005), the control unit 1008 ends the processing. In addition, before ending the processing, the control unit 1008 may execute processing for transmitting an error to the client apparatus 2000.

In step S3006, according to the resolution specified by the image setting information, the control unit 1008 prepares bitmap data stored in the OSD generation unit 1007 for the OSD super imposition image. Then, in order to express the superimposed image in a uniform ratio without depending on the image size, the control unit 1008 reads different font sizes from the storage unit 1009 and prepares a plurality of pieces of bitmap data according to the resolution. Alternatively, the control unit 1008 executes scaling processing of a plurality of pieces of bitmap data according to the image size as necessary, and prepares the bitmap data for the OSD super imposition image. If the superimposed image is reduced in proportion to the image size, the superimposed image is illegible when the image size is small. Therefore, the control unit 1008 executes nonlinear processing to prepare the bitmap data for the OSD super imposition image. Then, the processing proceeds to step S3007.

In step S3007, the control unit 1008 generates bitmap data as the OSD super imposition image corresponding to the display target characters included in the OSD setting command transmitted from the client apparatus 2000. Then, the processing proceeds to step S3008.

In step S3008, the control unit 1008 reflects the OSD setting information with respect to the OSD super imposition image generated in step S3007 and the object image input by the image processing unit 1003 in the compressing and coding unit 1004. In addition, the OSD setting information includes information relating to an image display position, color, and a degree of transparency of the OSD super imposition image. In other words, in step S3008, the control unit 1008 executes conversion of a superimposed position of the bitmap data that is to be superimposed thereon, and executes preparation of the color and the degree of transparency. Then, the control unit 1008 ends the processing. For example, in a case where the information reflected as the OSD setting information includes time that is to be updated every second, the OSD generation unit 1007 reflects a new OSD super imposition image and new OSD setting information on the compressing and coding unit 1004 according to every second of the update.

Further, the compressing and coding unit 1004 reflects the received OSD super imposition image and the OSD setting information on the image size or the resolution of the image based on the coding setting information, and superimposes the OSD super imposition image on the object image received from the image processing unit 1003. Thereafter, the compressing and coding unit 1004 compresses and encodes the image on which the OSD super imposition image is superimposed according to the specified coding method. Through the above-described processing, the image on which the OSD super imposition image is superimposed is distributed to the external apparatus via the communication unit 1005 as a streaming image.

Subsequently, typical command sequence from starting of setting, distributing the image, and ending the distribution executed by the imaging apparatus 1000 and the client apparatuses 2000 (2100) will be described with reference to FIGS. 5 and 6.

Figure 5:
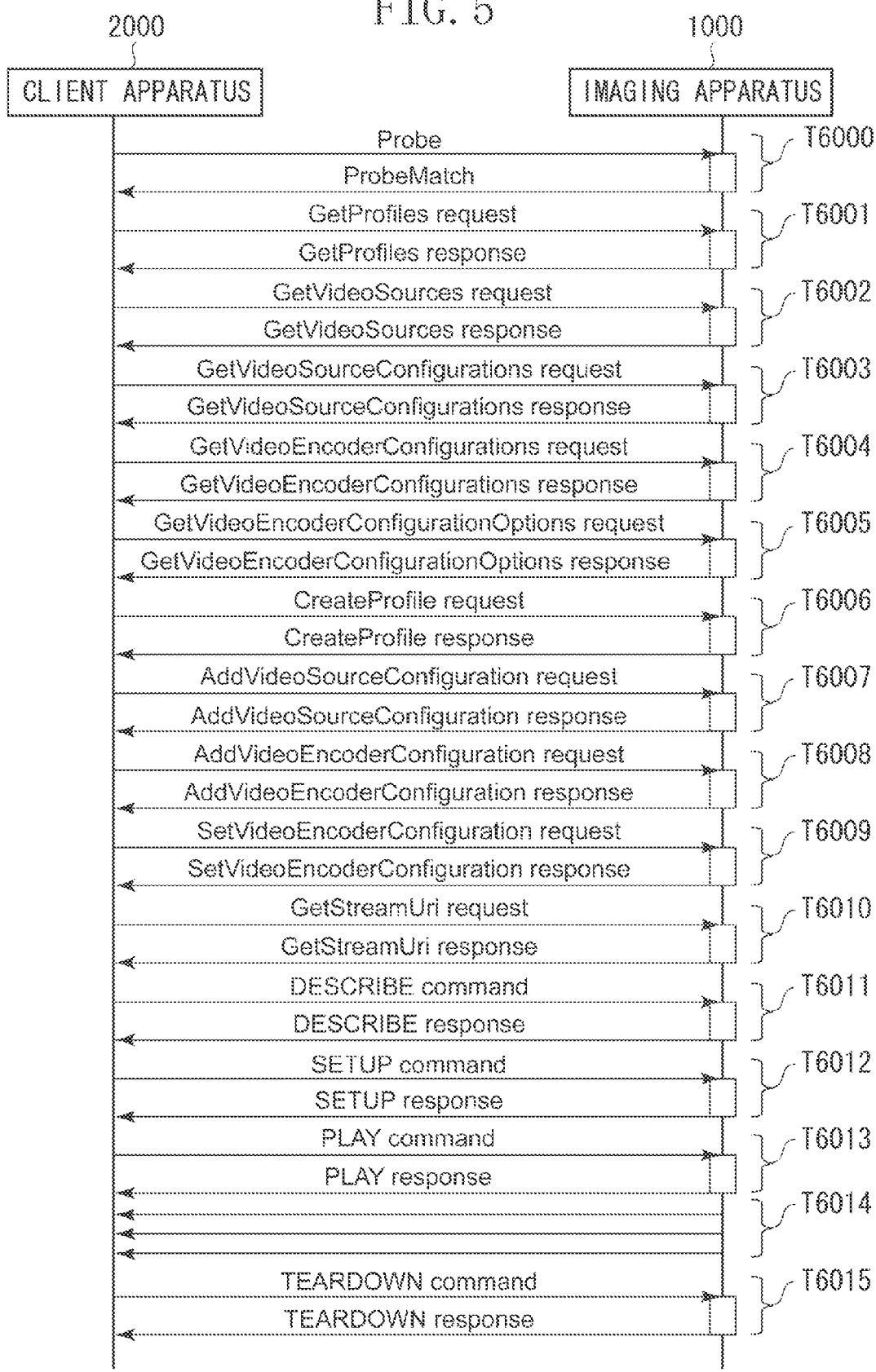
FIG. 5 is a basic command sequence diagram of a first communication protocol.

FIG. 5 is a sequence diagram illustrating a state where the client apparatus 2000 is connected to the imaging apparatus 1000 to execute image distribution. FIG. 6 is a sequence diagram illustrating a state where the client apparatus 2100 other than the client apparatus 2000 is connected to the imaging apparatus 1000 to execute image distribution and subsequently end the image distribution. In addition, the imaging apparatus 1000 may be connected to a plurality of client apparatuses simultaneously. In the present exemplary embodiment, in FIG. 5, the client apparatus 2000 and the imaging apparatus 1000 communicate with each other using the protocol based on the ONVIF standard. On the other hand, the client apparatus 2100 and the imaging apparatus 1000 communicate with each other using the protocol based the GB28181 standard.

FIG. 5 illustrates a typical command sequence from the starting of setting to the distribution of the image, executed between the imaging apparatus 1000 and the client apparatus 2000. Herein, a command transmitted to the imaging apparatus 1000 from the client apparatus 2000 and a response with respect to the command returned to the client apparatus 2000 from the imaging apparatus 1000 are treated as a pair of transaction.

In transaction T6000, the client apparatus 2000 and the imaging apparatus 1000 execute search transaction of a device. The client apparatus 2000 performs multicast transmission of a Probe command (search request) including a predetermined condition, through the network. The search transaction is completed when the imaging apparatus 1000 that matches the condition of the search request transmits a ProbeMatch command (search response) to the client apparatus 2000.

In transaction T6001, the client apparatus 2000 and the imaging apparatus 1000 execute transaction for acquiring a distribution profile (i.e., "GetProfiles"). The client apparatus 2000 identifies setting of a distributable media profile (i.e., distribution profile) existing in the imaging apparatus 1000 by a distribution profile identification (ID), and acquires a list of currently-usable distribution profiles together with the distribution profile ID.

More specifically, the client apparatus 2000 transmits a GetProfiles command to the imaging apparatus 1000. Then, the imaging apparatus 1000 receives the GetProfiles command and transmits a list of media profiles to the client apparatus 2000. Through the transaction T6001, the client apparatus 2000 acquires a list of the media profiles currently usable in the imaging apparatus 1000 together with the distribution profile ID for identifying the media profile.

In transaction T6002, the client apparatus 2000 and the imaging apparatus 1000 execute transaction for acquiring a function of the image processing unit 1003 (i.e., "GetVideoSources"). Through the transaction T6002, the client apparatus 2000 acquires setting information of the image processing function of the image processing unit 1003 included in the imaging apparatus 1000.

More specifically, the client apparatus 2000 transmits a GetVideoSources command to the imaging apparatus 1000. Then, the imaging apparatus 1000 receives the GetVideoSources command and returns a response in response to this command, to the client apparatus 2000. Through the transaction T6002, the client apparatus 2000 acquires the setting information of the image processing function included in the imaging apparatus 1000.

In transaction T6003, the client apparatus 2000 and the imaging apparatus 1000 execute transaction for acquiring a list of image processing setting (i.e., "GetVideoSourceConfigurations"). Through the transaction T6003, the client apparatus 2000 acquires a list including an image processing setting ID stored in the imaging apparatus 1000.

More specifically, the client apparatus 2000 transmits a GetVideoSourceConfigurations command to the imaging apparatus 1000. The imaging apparatus 1000 receives the GetVideoSourceConfigurations command and returns a list including the image processing setting ID stored in the imaging apparatus 1000 to the client apparatus 2000. This list is one example of the image setting information generated by the control unit 1008.

In transaction T6004, the client apparatus 2000 and the imaging apparatus 1000 execute transaction for acquiring a function of the compressing and coding unit 1004 (i.e., "GetVideoEncoderConfigurations"). Through the transaction T6004, the client apparatus 2000 acquires information relating to the function provided by the compressing and coding unit 1004 of the imaging apparatus 1000.

More specifically, the client apparatus 2000 transmits a GetVideoEncoderConfigurations command to the imaging apparatus 1000. The imaging apparatus 1000 receives this command and returns a response in response to this command. Through transaction T6004, the client apparatus 2000 acquires the information relating to the function provided by the compressing and coding unit 1004 of the imaging apparatus 1000. This information is one example of the coding setting information generated by the control unit 1008.

In transaction T6005, the client apparatus 2000 and the imaging apparatus 1000 execute transaction for acquiring a list of compressing and coding setting (i.e., "GetVodeoEncoderConfigurationOptions"). Through transaction T6005, the client apparatus 2000 acquires the list including a compressing and coding setting ID with respect to the compressing and coding unit 1004 stored in the storage unit 1009.

More specifically, the client apparatus 2000 transmits a GetVideoEncoderConfigurationOptions command to the imaging apparatus 1000. The imaging apparatus 1000 receives this command and returns a response in response to this command. Through transaction T6005, the client apparatus 2000 acquires the list including the compressing and coding setting ID stored in the storage unit 1009 from the imaging apparatus 1000.

In transaction T6006, the client apparatus 2000 and the imaging apparatus 1000 execute transaction for requesting to create the distribution profile (i.e., "CreateProfile"). Through transaction T6006, the client apparatus 2000 newly creates a distribution profile within the imaging apparatus 1000 and acquires an ID of that created distribution profile. The imaging apparatus 1000 stores the newly-created distribution profile.

More specifically, the client apparatus 2000 transmits a CreateProfile command to the imaging apparatus 1000. The imaging apparatus 1000 receives this command and returns a response in response to this command. Through transaction T6006, the client apparatus 2000 newly creates a distribution profile within the imaging apparatus 1000 and acquires an ID for the created distribution profile. Further, the imaging apparatus 1000 stores the newly-created distribution profile.

In transaction T6007, the client apparatus 2000 and the imaging apparatus 1000 execute transaction for requesting to add the image processing setting (i.e., "AddVideoSource- Configuration"). Through transaction T6007, the client apparatus 2000 specifies the ID of the distribution profile acquired in transaction T6006 and the ID of the image processing setting acquired in transaction T6003. The imaging apparatus 1000 stores the specified distribution profile and the specified image processing setting in association with each other.

More specifically, the client apparatus 2000 transmits an AddVideoSourceConfiguration command to the imaging apparatus 1000. The imaging apparatus 1000 receives this command and returns a response in response to this command, to the client apparatus 2000. The command transmitted in transaction T6007 is one example of the image setting command.

In transaction T6008, the client apparatus 2000 and the imaging apparatus 1000 execute transaction for requesting to add the compressing and coding setting (i.e., "AddVideoEncoderConfiguration"). Through transaction T6008, the client apparatus 2000 specifies the ID of the distribution profile acquired in transaction T6006 and the ID of the compressing and coding setting acquired in transaction T6004, and associates the compressing and coding setting with the distribution profile. The imaging apparatus 1000 stores the specified distribution profile and the specified compressing and coding setting in association with each other.

More specifically, the client apparatus 2000 transmits an AddVideoEncoderConfiguration command to the imaging apparatus 1000. Then, the imaging apparatus 1000 returns a response in response to this command, to the client apparatus 2000.

In transaction T6009, the client apparatus 2000 and the imaging apparatus 1000 execute transaction for changing the compressing and coding setting (i.e., "SetVideoEncoderConfiguration"). Through transaction T6009, the client apparatus 2000 changes the content of the compressing and coding setting acquired in transaction T6004 based on the option acquired in transaction T6005. For example, the client apparatus 2000 changes a compressing and coding method or a clipping size. The imaging apparatus 1000 stores the content of in the changed compressing and coding setting.

More specifically, the client apparatus 2000 transmits a SetVideoEncoderConfiguration command to the imaging apparatus 1000. The imaging apparatus 1000 receives this command and returns a response in response to this command. In addition, the commands in transaction T6008 and T6009 are examples of the above-described encoding setting command.

In transaction T6010, the client apparatus 2000 and the imaging apparatus 1000 execute transaction for requesting to acquire a distribution address (i.e., "GetStreamUri"). Through transaction T6010, the client apparatus 2000 specifies the ID of the distribution profile acquired in transaction T6006 and acquires a distribution address for acquiring the image that is to be distributed based on the setting of the specified distribution profile. The imaging apparatus 1000 returns a distribution address for distributing the image corresponding to the content of the image processing setting and the compressing and coding setting associated with the ID of the specified distribution profile, to the client apparatus 2000. In transaction T6011, the client apparatus 2000 and the imaging apparatus 1000 execute transaction for requesting to acquire distribution information (i.e., "DESCRIBE"). Through transaction T6011, the client apparatus 2000 specifies the distribution address acquired in transaction T6010 and acquires detailed data relating to the distribution information of the imaging apparatus 1000.

More specifically, the client apparatus 2000 transmits a DESCRIBE command to the imaging apparatus 1000. The imaging apparatus 1000 receives this command and returns a response in response to this command, to the client apparatus 2000.

In transaction T6012, the client apparatus 2000 and the imaging apparatus 1000 execute transaction for requesting distribution setting (i.e., "SETUP"). In transaction T6012, the client apparatus 2000 requests the imaging apparatus 1000 to prepare for streaming based on the detailed data relating to the distribution information acquired in transaction T6011. By executing this command, the client apparatus 2000 and the imaging apparatus 1000 share a transmission method of the streaming including a session number.

More specifically, the client apparatus 2000 transmits a SETUP command to the imaging apparatus 1000. The imaging apparatus 1000 receives this command and returns a response in response to this command, to the client apparatus 2000.

In transaction T6013, the client apparatus 2000 and the imaging apparatus 1000 execute transaction for starting distribution (i.e., "PLAY"). By using the session number acquired in transaction T6012, the client apparatus 2000 requests the imaging apparatus 1000 to start streaming of the image based on the setting of the specified distribution profile.

More specifically, the client apparatus 2000 transmits a PLAY command to the imaging apparatus 1000. The imaging apparatus 1000 receives this command and returns a response in response to this command, to the client apparatus 2000.

In transaction T6014, the imaging apparatus 1000 distributes the streaming image to the client apparatus 2000. The streaming image corresponding to the start request of distribution in transaction T6013 is distributed according to the transmission method shared in transaction T6012.

In transaction T6015, the client apparatus 2000 and the imaging apparatus 1000 execute transaction for stopping the distribution (i.e., "TEARDOWN"). Through transaction T6015, the client apparatus 2000 specifies the session number acquired in transaction T6012 to stop distribution of the streaming image.

Figure 6:
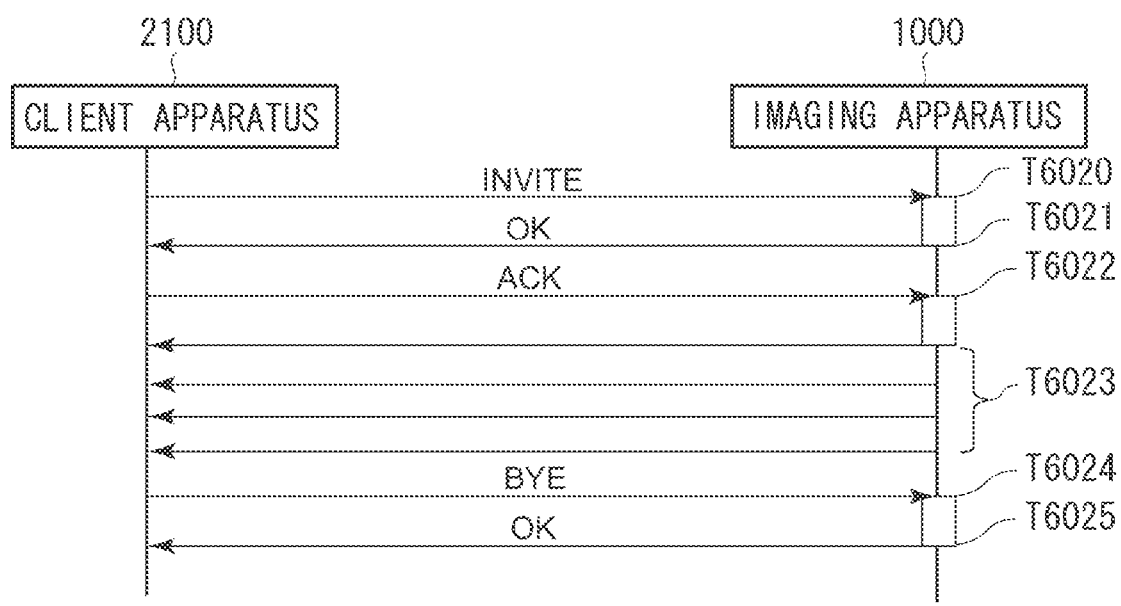
FIG. 6 is a basic command sequence diagram of a second communication protocol.

FIG. 6 is a diagram illustrating a typical command sequence from starting to ending image distribution executed by the imaging apparatus 1000 and the client apparatus 2100.

In transaction T6020, the client apparatus 2100 sends an INVITE message to the imaging apparatus 1000. The INVITE message includes a device identification code of the imaging apparatus 1000 that receives the message, an identification code of the client apparatus 2100, and required resolution. In a case where the resolution is to be changed, the client apparatus 2100 transmits the INVITE message again.

In transaction T6021, the imaging apparatus 1000 sends an OK response to the client apparatus 2100. The OK response includes information of a media format provided by the imaging apparatus 1000.

In transaction T6022, the client apparatus 2100 sends an ACK message to the imaging apparatus 1000. The ACK message includes specification information of the media format. Establishment processing of an INVITE session is completed by transmitting the ACK message.

In transaction T6023, the imaging apparatus 1000 distributes a streaming image to the client apparatus 2100. The streaming image is continuously distributed until the imaging apparatus 1000 receives a BYE command in transaction T6024 or the network is disconnected.

In transaction T6024, the client apparatus 2100 sends a BYE message to the imaging apparatus 1000. With the BYE message, the INVITE session established between the client apparatus 2100 and the imaging apparatus 1000 is disconnected.

In transaction T6025, the imaging apparatus 1000 sends an OK message to the client apparatus 2100. The imaging apparatus 1000 disconnects the session with the client apparatus 2100.

Figure 7:
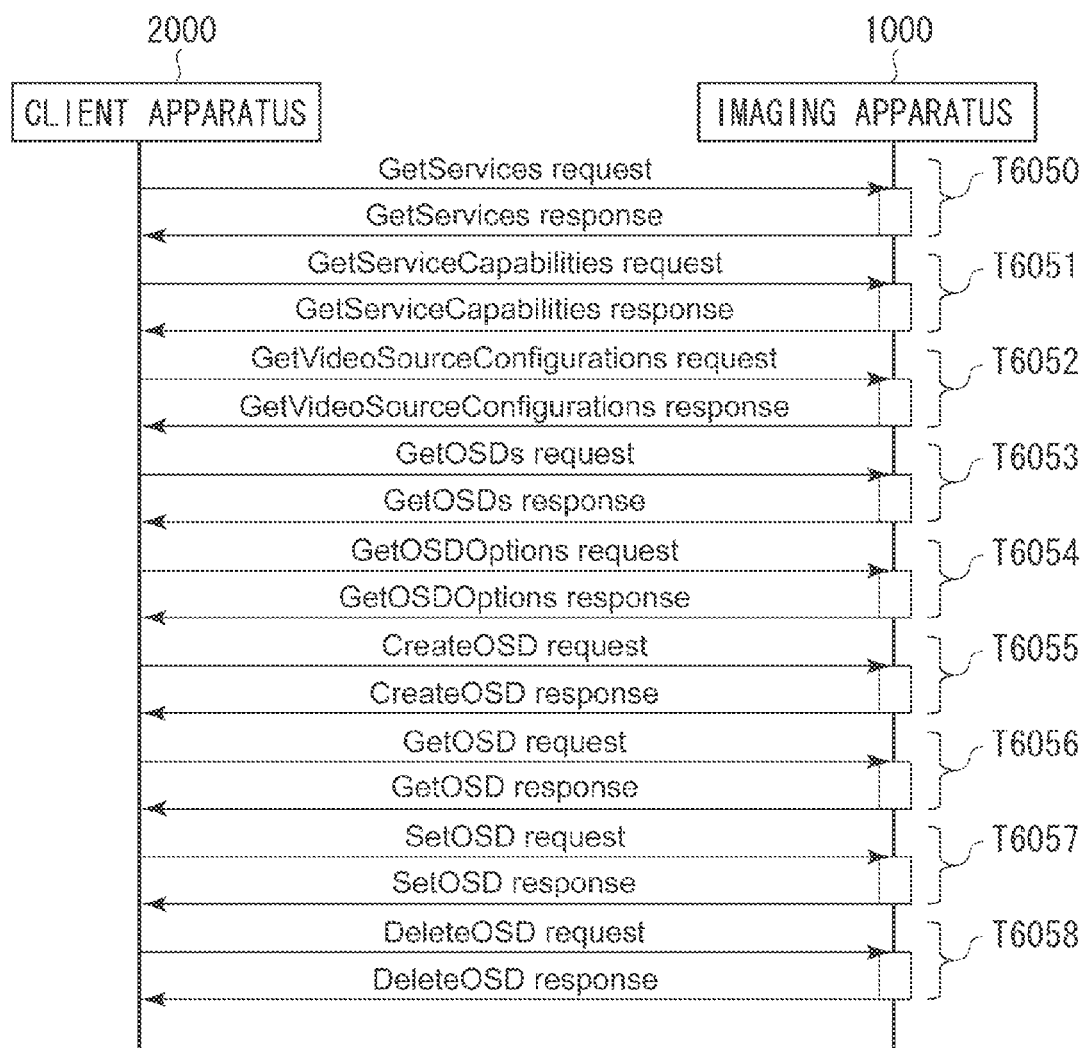
FIG. 7 is a command sequence diagram of OSD setting.

FIG. 7 is a diagram illustrating a typical command sequence for image superimposing processing executed by the imaging apparatus 1000 and the client apparatus 2000.

In transaction T6050, the client apparatus 2000 and the imaging apparatus 1000 execute transaction for requesting to acquire functions (i.e., "GetServices"). In transaction T6050, the client apparatus 2000 acquires a list of functions included in the imaging apparatus 1000. The client apparatus 2000 confirms whether the imaging apparatus 1000 has an image processing function and a compressing and coding function.

More specifically, the client apparatus 2000 transmits a GetServices command to the imaging apparatus 1000. The imaging apparatus 1000 receives this command and returns a response in response to this command.

In transaction T6051, the client apparatus 2000 and the imaging apparatus 1000 execute transaction for requesting to acquire the function corresponding to the image superimposing processing (i.e., "GetServiceCapabilities"). This transaction is executed in order to request to acquire the function corresponding to the image superimposing processing. Through transaction T6051, the client apparatus 2000 confirms whether the imaging apparatus 1000 supports the image superimposing processing. For example, the control unit 2001 receives superimposing capability information indicating whether the imaging apparatus 1000 can execute the image superimposing processing from the imaging apparatus 1000 via the communication unit 2006.

More specifically, the client apparatus 2000 transmits a GetServiceCapabilities command to the imaging apparatus 1000. The imaging apparatus 1000 receives this command and returns a response in response to this command.

In transaction T6052, the client apparatus 2000 and the imaging apparatus 1000 execute transaction for acquiring a list of image processing setting (i.e., "GetVideoSourceConfigurations"). Through transaction T6052, the client apparatus 2000 acquires a list including the image processing setting ID stored in the imaging apparatus 1000 from the imaging apparatus 1000.

More specifically, the client apparatus 2000 transmits a GetVideoSourceConfigurations command to the imaging apparatus 1000. Then, the imaging apparatus 1000 receives this command and returns a response in response to this command to the client apparatus 2000. In addition, the list is one example of the image setting information generated by the control unit 1008.

In transaction T6053, the client apparatus 2000 and the imaging apparatus 1000 execute transaction for requesting to acquire a list of image superimposing setting (i.e., "GetOSDs"). In transaction T6053, the client apparatus 2000 specifies the image processing setting ID acquired in transaction T6052. Then, the client apparatus 2000 acquires a list of all the image superimposing setting including "OSDToken" serving as an image superimposing setting ID associated with the image processing setting stored in the imaging apparatus 1000.

More specifically, the client apparatus 2000 transmits a GetOSDs command to the imaging apparatus 1000. Then, the imaging apparatus 1000 receives this command and returns a response in response to this command to the client apparatus 2000.

In transaction T6054, the client apparatus 2000 and the imaging apparatus 1000 execute transaction for acquiring an option for the image superimposing setting (i.e., "GetOSDOptions"). Through transaction T6054, the client apparatus 2000 specifies the image processing setting ID acquired in transaction T6052. Then, the client apparatus 2000 acquires a range of the options or setting values settable to the parameter of the image superimposing setting associated with the image processing setting stored in the imaging apparatus 1000.

More specifically, the client apparatus 2000 transmits a GetOSDOptions command to the imaging apparatus 1000. Then, the imaging apparatus 1000 receives this command and returns a response in response to this command to the client apparatus 2000.

In transaction T6055, the client apparatus 2000 and the imaging apparatus 1000 execute transaction for creating the image superimposing setting (i.e., "CreateOSD"). Through transaction T6055, the client apparatus 2000 creates new image superimposing setting within the imaging apparatus 1000 based on the option acquired in transaction T6054. The imaging apparatus 1000 returns the OSDToken serving as the image superimposing setting ID according to the image superimposing setting specified by the client apparatus 2000.

More specifically, the client apparatus 2000 transmits a CreateOSD command to the imaging apparatus 1000. The imaging apparatus 1000 receives this command and returns a response in response to this command to the client apparatus 2000.

In transaction T6056, the client apparatus 2000 and the imaging apparatus 1000 execute transaction for requesting to acquire the image superimposing setting (i.e., "GetOSD"). The client apparatus 2000 acquires the image superimposing setting by using the OSDToken serving as the image superimposing setting ID acquired in transaction T6055.

More specifically, the client apparatus 2000 transmits a GetOSD command to the imaging apparatus 1000. The imaging apparatus 1000 receives this command and returns a response in response to this command to the client apparatus 2000. In addition, the responses in transactions T6053 and T6056 are examples of the OSD setting information generated by the control unit 1008.

In transaction T6057, the client apparatus 2000 and the imaging apparatus 1000 execute transaction for changing the image superimposing setting (i.e., "SetOSD"). Through transaction T6057, the client apparatus 2000 specifies the content of the image superimposing setting acquired in transaction T6056 or the content of the image superimposing setting newly created in transaction T6055 by the OSDToken serving as the image superimposing setting ID. Then, the client apparatus 2000 can change the image superimposing setting based on the option acquired in transaction T6054. For example, the client apparatus 2000 changes a superimposed position or content of superimposed text.

More specifically, the client apparatus 2000 transmits a SetOSD command to the imaging apparatus 1000. The imaging apparatus 1000 receives this command and returns a response in response to this command to the client apparatus 2000. Meanwhile, the response in transaction T6057 does not include the OSDToken. Further, the commands in transactions T6055 and T6057 are examples of the above-described OSD setting command.

In transaction T6058, the client apparatus 2000 and the imaging apparatus 1000 execute transaction for deleting the image superimposing setting (i.e., "DeleteOSD"). Through transaction T6058, the client apparatus 2000 deletes the image superimposing setting acquired in transaction T6053 or T6056 and the image superimposing setting newly created in transaction T6055 from the imaging apparatus 1000. The imaging apparatus 1000 deletes the image superimposing setting having the OSDToken corresponding to the specified image superimposing setting ID.

More specifically, the client apparatus 2000 transmits a DeleteOSD command to the imaging apparatus 1000. The imaging apparatus 1000 receives this command and returns a response in response to this command to the client apparatus 2000.

Subsequently, processing for determining a protocol executed at the time of receiving a distribution start command will be described with reference to the flowchart in FIG. 8. Herein, a communication protocol is determined in order to superimpose the appropriate OSD for the given resolution even in a case where different required resolution or a specific font for the OSD is prescribed in the protocol. This processing is executed by the control unit 1008.

At first, the imaging apparatus 1000 receives the distribution start command from the client apparatus 2000. In the communication based on the ONVIF standard, the distribution start command corresponds to "Play command" in transaction T6013 of FIG. 5, and in the communication based on the GB28181 standard, the distribution start command corresponds to "ACK" in transaction T6022 of FIG. 6. Then, the processing proceeds to step S8001.

In step S8001, the control unit 1008 acquires a request line corresponding to a part of description of the control command. In the ONVIF standard, the control command for controlling the imaging apparatus 1000 is transmitted by using a hypertext transfer protocol (HTTP). On the other hand, in the GB28181 standard, the control command is transmitted by using a session initiation protocol (SIP). In these standards, a message is exchanged in a text format by using the HTTP or the SIP, and a first line of a text message (description content) is referred to as "request line". The request line is also referred to as "start line". The client apparatus 2000 transmits the request message to the imaging apparatus 1000, so that the control unit 1008 of the imaging apparatus 1000 acquires a first line of the request message. Then, the processing proceeds to step S8002.

In step S8002, the control unit 1008 determines whether the client apparatus 2000 performs communication based on the ONVIF standard, the GB28181 standard, or other protocols. More specifically, the control unit 1008 analyzes the request line acquired in step S8001 and determines in what standard the communication is performed. The request line is configured of three elements such as a method, a request uniform resource identifier (URI), and protocol version information. The third element, the protocol version information, is described as "HTTP/1.1" for the HTTP, and "SIP/2.0" for the SIP. Therefore, the control unit 1008 determines that the communication is performed based on the ONVIF standard if the protocol version information is described as "HTTP/x.x" ("x" is a given value) while the request URI includes "onvif". On the other hand, the control unit 1008 determines that the communication is performed based on the GB28181 standard when the protocol version information is described as "SIP/x.x" ("x" is a given value). Then, in a case where the control unit 1008 determines that the communication is performed based on the ONVIF standard ("ONVIF" in step S8002), the processing proceeds to step S8003. In a case where the control unit 1008 determines that the communication is performed based on the GB28181 standard ("GB28181" in step S8002), the processing proceeds to step S8004. In a case where the control unit 1008 determines that the communication is performed based on neither ONVIF standard nor the GB28181 standard, the processing proceeds to step S8005.

In step S8003, the control unit 1008 substitutes "ONVIF" into the protocol type. Then, the control unit 1008 stores the protocol type acquired last in the storage unit 1009, and ends the processing.

In step S8004, the control unit 1008 substitutes "GB28181" into the protocol type. Further, in step S8005, the control unit 1008 substitutes "other" into the protocol type. Thereafter, the control unit 1008 stores the acquired protocol type in the storage unit 1009, and ends the processing.

FIG. 9 is a correspondence table illustrating the lower-limit resolution for superimposing the OSD with respect to the protocol type. The OSD generation unit 1007 uses the correspondence table to calculate the lower-limit resolution for superimposing the OSD in step S3004. When the protocol type stored in the storage unit 1009 in step S8003, S8004, or S8005 is input thereto, corresponding lower-limit resolution for superimposing the OSD can be calculated. In the present exemplary embodiment, the lower-limit resolution is 320×240 when the protocol type is the ONVIF standard, whereas the lower-limit resolution is 352×288 when the protocol type is the GB22818 standard. The control unit 1008 can determine whether to superimpose the OSD in step S3005 based on the combination of the calculated lower-limit resolution for superimposing the OSD and the resolution acquired in step S3002.

Figure 8:
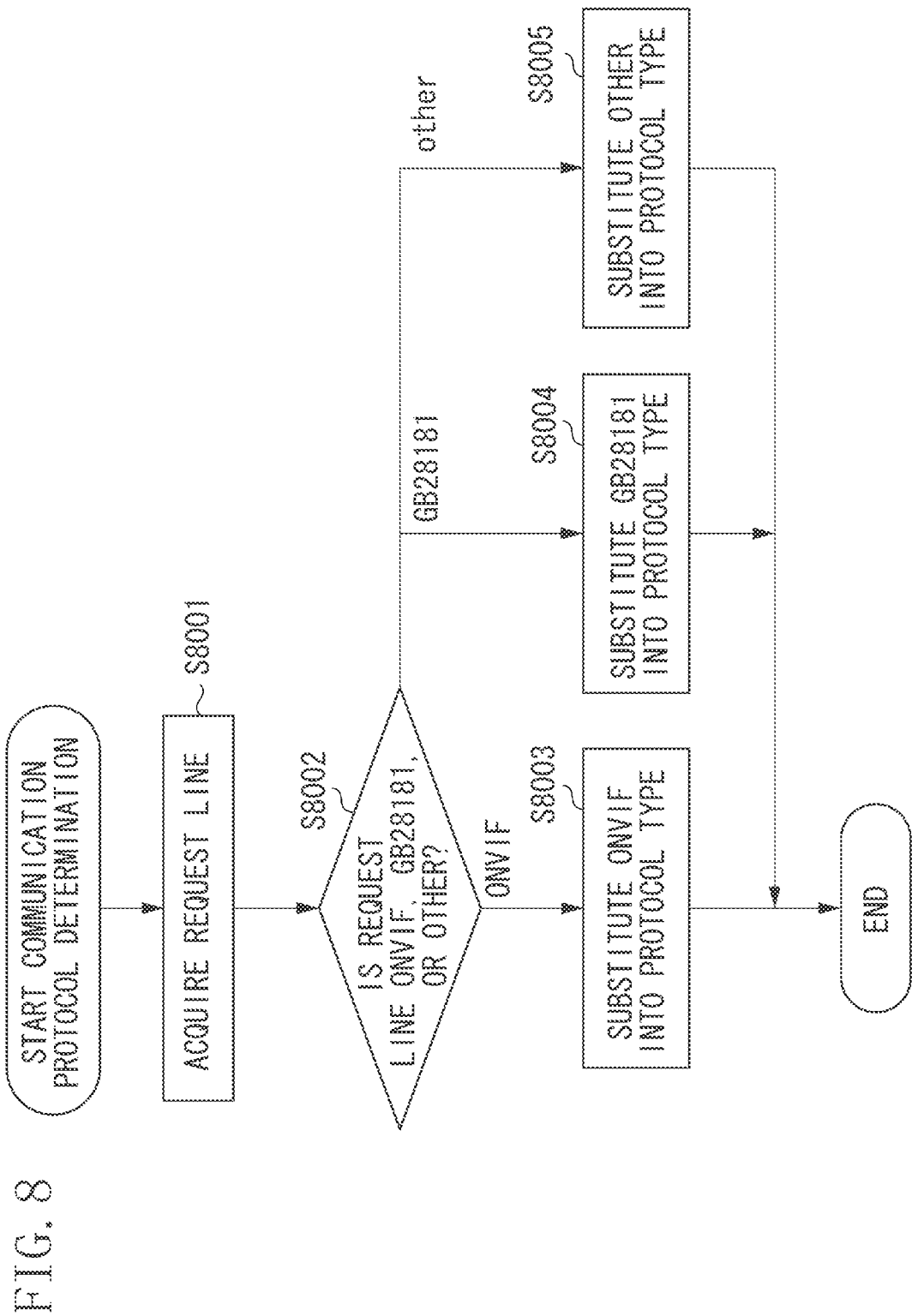
FIG. 8 is a flowchart illustrating processing for determining a communication protocol.

In the present exemplary embodiment, in step S8002 of FIG. 8, a protocol type used for communication has been determined by determining the request line. However, the protocol type may be determined based on the information other than the request line.

Further, in the present exemplary embodiment, in step S8002 of FIG. 8, determination has been made with respect to the ONVIF standard and the GB28181 standard. However, determination may be made with respect to other standards.

Figure 4:
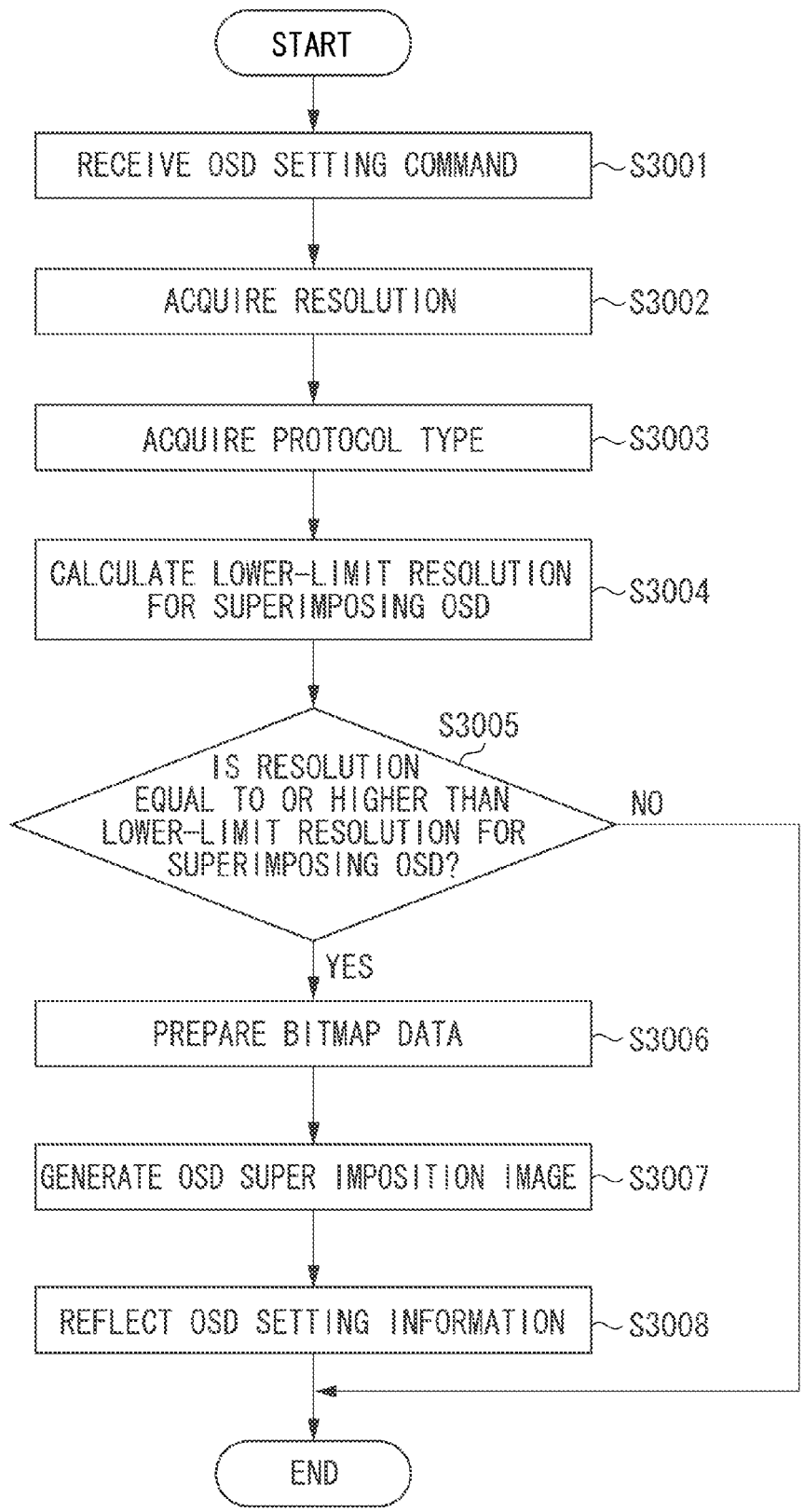
FIG. 4 is a flowchart illustrating processing for an on-screen display (OSD) superimposing.

Furthermore, in the present exemplary embodiment, in step S3004 of FIG. 4, lower-limit resolution for superimposing the OSD has been calculated according to a protocol type. However, a plurality of protocol types may be used in order to calculate the lower-limit resolution. In this case, a protocol type having the lowest or the highest resolution may be used for the calculation.

The exemplary embodiments according to the present invention have been described above. However, the present invention is not limited to the exemplary embodiments described above, and various modifications and changes are possible within the scope of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-119051, filed Jun. 9, 2014, which is hereby incorporated by reference herein in its entirety.

What is claimed is:

1. An image processing apparatus capable of mutually communicating with an external apparatus via a network by using a communication protocol from among a plurality of communication protocols which are supported by the image processing apparatus, the image processing apparatus comprising:
   a setting unit configured to set an image size of a first image;
   a first generation unit configured to generate the first image in the image size set by the setting unit;
   a receiving unit configured to receive a request of a protocol type corresponding to the communication protocol for communication with the external apparatus from the external apparatus;
   a processing unit configured to superimpose a second image into the first image in a case where the image size, set by the setting unit, matches a condition corresponding to the protocol type; and
   a transmission unit configured to transmit the first image, into which the second image is superimposed, to the external apparatus in a case where the image size matches the condition corresponding to the protocol type, or to transmit an error in a case where the image size does not match the condition corresponding to the protocol type.

2. The image processing apparatus according to claim 1, further comprising a determination unit configured to determine the protocol type of the request based on a description content of the request.

3. The image processing apparatus according to claim 1, wherein the condition is lower-limit of resolution for superimposing on-screen display (OSD).

4. The image processing apparatus according to claim 3, wherein the lower-limit of resolution is 320×240 when the protocol type is open network video interface forum (ONVIF).

5. The image processing apparatus according to claim 3, wherein the lower-limit of resolution is 352×288 when the protocol type is GuoBiao/Tuijian 28181 (GB/T28181).

6. The image processing apparatus according to claim 3, wherein the lower-limit of resolution in hypertext transfer protocol (HTTP) is smaller than that in session initiation protocol (SIP).

7. The image processing apparatus according to claim 1, further comprising a storage unit configured to store a plurality of conditions corresponding to respective protocol types.

8. A control method of an image processing apparatus capable of mutually communicating with an external apparatus via a network by using a communication protocol from among a plurality of communication protocols which are supported by the image processing apparatus, the control method comprising:
   setting an image size of a first image;
   generating, as a first generation, the first image in the set image size;
   receiving a request of a protocol type corresponding to the communication protocol for communication with the external apparatus from the external apparatus;
   superimposing a second image into the first image in a case where the set image size matches a condition corresponding to the protocol type; and
   transmitting the first image, into which the second image is superimposed, to the external apparatus in a case where the image size matches the condition corresponding to the protocol type, or transmitting an error in a case where the image size does not match the condition corresponding to the protocol type.

9. A non-transitory computer-readable storage medium storing a computer program causing a computer to perform the control method according to claim 8.

10. The method according to claim 8, further comprising determining the protocol type of the request based on a description content of the request.

11. The method according to claim 8, wherein the condition is lower-limit of resolution for superimposing on-screen display (OSD).

12. The method according to claim 11, wherein the lower-limit of resolution is 320×240 when the protocol type is open network video interface forum (ONVIF).

13. The method according to claim 11, wherein the lower-limit of resolution is 352×288 when the protocol type is GuoBiao/Tuijian 28181 (GB/T28181).

14. The method according to claim 8, wherein the lower-limit of resolution in hypertext transfer protocol (HTTP) is smaller than that in session initiation protocol (SIP).

15. An image processing apparatus capable of mutually communicating with an external apparatus via a network by using a communication protocol from among a plurality of communication protocols which are supported by the image processing apparatus, the image processing apparatus comprising:
   a receiving unit configured to receive a request for communication with the external apparatus from the external apparatus, wherein the request includes a description corresponding to a protocol type of the communication protocol;
   a generation unit configured to generate a first image which is equal to or larger than a minimum image size corresponding to the protocol type of the description included in the request received by the receiving unit;
   a processing unit configured to superimpose a second image into the first image; and
   a transmission unit configured to transmit the first image, into which the second image is superimposed, to the external apparatus.

16. The image processing apparatus according to claim 15, wherein the generation unit generates the first image which size is 320×240 or larger than 320×240 when the protocol type is open network video interface forum (ONVIF).

17. The image processing apparatus according to claim 15, wherein the generation unit generates the first image which size is 352×288 or larger than 352×288 when the protocol type is GuoBiao/Tuijian 28181 (GB/T28181).

18. The image processing apparatus according to claim 15, wherein the plurality of communication protocols include open network video interface forum (ONVIF) and GuoBiao/Tuijian 28181 (GB/T28181), wherein the generation unit generates the first image which size is 320×240 or larger than 320×240 when the protocol type is ONVIF, and wherein the generation unit generates the first image which size is 352×288 or larger than 352×288 when the protocol type is GB/T28181.

19. The image processing apparatus according to claim 15, wherein the plurality of communication protocols include hypertext transfer protocol (HTTP) and session initiation protocol (SIP), and wherein the minimum image size in HTTP is smaller than that in SIP.

20. A control method of an image processing apparatus capable of mutually communicating with an external apparatus via a network by using a communication protocol from among a plurality of communication protocols which are supported by the image processing apparatus, the control method comprising:

receiving a request for communication with the external apparatus from the external apparatus, wherein the request includes a description corresponding to a protocol type of the communication protocol;

generating a first image which is equal to or larger than a minimum image size corresponding to the protocol type of the description included in the received request;

superimposing a second image into the first image; and transmitting the first image, into which the second image is superimposed, to the external apparatus.

21. The method according to claim 20, wherein the first image is 320×240 or larger than 320×240 when the protocol type is open network video interface forum (ONVIF).

22. The method according to claim 20, wherein the first image is 352×288 or larger than 352×288 when the protocol type is GuoBiao/Tuijian 28181 (GB/T28181).

23. The method according to claim 20, wherein the plurality of communication protocols include open network video interface forum (ONVIF) and GuoBiao/Tuijian 28181 (GB/T28181), wherein the first image which size is 320×240 or larger than 320×240 is generated in the generating when the protocol type is ONVIF, and wherein the first image which size is 352×288 or larger than 352×288 is generated in the generating when the protocol type is GB/T28181.

24. The method according to claim 20, wherein the plurality of communication protocols include hypertext transfer protocol (HTTP) and session initiation protocol (SIP), and wherein the minimum image size in HTTP is smaller than that in SIP.

* * * * *